Oct. 31, 1961 H. H. PLATT 3,006,205
TRANSMISSIONS
Filed Feb. 24, 1959 11 Sheets-Sheet 1

INVENTOR.
HAVELAND H. PLATT
BY
ATTORNEYS

INVENTOR.
HAVILAND H. PLATT
BY
ATTORNEYS

Oct. 31, 1961

H. H. PLATT 3,006,205

TRANSMISSIONS

Filed Feb. 24, 1959

INVENTOR.
HAVILAND H. PLATT
BY
Fuschlein, Fuschlein + Ortze
ATTORNEYS

FIG. 12

3,006,205
TRANSMISSIONS
Haviland H. Platt, 19 E. 53rd St., New York 22, N.Y.
Filed Feb. 24, 1959, Ser. No. 794,994
13 Claims. (Cl. 74—125)

The present invention relates to transmissions, and more particularly to rotary speed changing transmissions, that is to say, to transmissions in which two rotary members are turned at definite different angular velocities, one constituting an input member and the other an output member.

In particular, the invention is concerned with speed changing transmissions which are of a unidirectional rotary type, that is to say, to transmissions in which when in operation, the member that happens to be the input member at the time only will function to drive in one direction of rotation but not in the other. However, it is within the scope of my invention to have either member act as the driving member. Thus, the term "unidirectional" as used in this specification and in the appended claims connotes ability to transmit power in only a single direction of rotation and an inability to transmit power in the opposite direction of rotation. It does not connote ability or inability to utilize only one member as an input member and the other as an output member.

Even more particularly, the invention includes both fixed speed transmissions and variable speed transmissions, that is to say, speed transmissions in which the angular velocity of the input member bears an unalterable ratio to the angular velocity of the output member, and speed transmissions in which this ratio can be changed at will.

It is the principal object of my invention to provide a novel transmission of the character described which is immensely superior to existing speed transmissions.

It is another object of my invention to provide a transmission of the character described which, particularly in comparison with existing fixed ratio speed transmissions, is, when constructed to be used as a fixed ratio speed transmission, more compact, smaller, lighter, and less expensive to make and maintain.

It is another object of my invention to provide a transmission of the character described which is capable of being arranged to effect substantial speed reductions in a small space, in a positive manner, with very few parts and at a high efficiency.

Transmissions of the variable speed type have for many many years—practically since the birth of the machine age—constituted an important, vital and necessary mechanical element of an enormous variety of widely used machines. Merely by way of example and in order to indicate the almost infinite variety of machines that employ variable speed transmissions, there are automobiles, drills, planers, lathes and other machine tools, feed mechanisms, cranes, airplane propeller drives, ship propeller drives, elevators, tenters, dying equipment, looms, knitting machines and other textile equipment, spoolers, beamers, mixers, spinners, and chain machines.

Until the present time these variable speed transmissions have had certain inherent deficiencies which have caused difficulties in their use. Quite obviously, the difficulties never have been sufficiently serious to prevent the use of such transmissions, particularly since almost all of the machinery mentioned would be practically useless without these transmissions. In order better to understand the sundry deficiencies of such previous transmissions, it is convenient to categorize said transmissions into three general groups.

One of these previous types is the gear shift, the principal deficiencies thereof being that: shifting requires an interruption of power flow and the cycling of a clutch or other temporary disconnecting device; a large number of parts must be used, at least one additional part and sometimes more than one being necessary for each different ratio of speed; the number of speed ratios is finite and usually quite limited due to the expense of adding each additional ratio, so that the change in ratios is discontinuous and as often as not, the optimum ratio for any particular situation is unavailable; and the maximum speed ratio is never very high, that is to say, the stepdown ratio of gear shift speed change transmissions customarily is rather small since high ratios necessitate complex mechanism and are tremendously wasteful of energy.

Belt shift transmissions may be considered as in the same category as gear shift transmissions inasmuch as they suffer from the same disadvantages, although they suffer from the same disadvantages, although they are, in addition, subject to slippage and power limitations.

The second category of variable speed transmissions is one which is continuous in its ability to change the speed ratio. Speed transmissions in this group employ friction between operating parts for the transmission of power. There are a wide variety of such transmissions and essentially they utilize friction discs, V-belts, pulleys and the like. The basic deficiencies of this second category of speed transmissions are: the lack of positiveness of the drive due to slippage; the inability to transmit large amounts of power due to the reliance on friction coefficients; the limitation of the range of change that can be secured through variation in the speed ratio, that is to say, the inability to vary the speed ratio from a compartively large fraction to a very small fraction; and the necessity for frequent adjustment and replacement of parts due to wear.

The third category of variable speed transmissions comprises hydraulic systems. These also occur in a great number of forms, but all suffer from some and usually most of the following deficiencies: low efficiency; heating; large bulk; high weight; high cost per unit of energy transmitted; limitation of the range of ratios; leakage; impositive drive; and highly skilled mechanics for repair.

It is another object of the present invention to avoid all of the drawbacks heretofore encountered in hitherto known speed changing transmissions, and, in general, to provide an entirely mechanical, extremely simple, positive system the speed ratio of which can be arranged to be varied continuously and without the interruption of power flow over an extremely wide range from near to a 1 to 1 ratio to an infinitely small ratio.

It is another object of my invention to provide a transmission of the character described which is uniquely advantageous as to size, cost, weight, expense and efficiency for high reduction ratios. This particular aspect of my invention is of great assistance in fields where such ratios are prevalent, for example, in applications such as the turbine drives of airplane and ship propellers where heretofore gear reductions of appreciable size, weight and cost have had to be used.

It is another object of my invention to provide a fixed ratio speed transmission of the character described wherein the fixed reduction ratio can be changed over a wide range by substitution of one simple part for another, thereby greatly reducing the number of the devices which must be stocked by the manufacturer and distributor. The same advantage, it will be appreciated, accrues to the user who can without duplication of the main part of the device readapt the same for sundry uses by a simple field alteration.

It is another object of my invention to provide a speed change transmission of the character described wherein the actuation of the output is completely smooth without any superposed fluctuations or unevenness, despite the utilization of high reduction ratios.

It is an ancillary object of my invention to provide a speed change transmission of the character described which is singularly capable of handling very large torques.

As has been noted above, continuously variable and hydraulic speed change transmissions are peculiarly subject to power limitations. But, as is sometimes not fully appreciated, gear transmissions also have power limitations. These limitations do not apply to gear transmissions in general, that is to say, it is possible to design a gear transmission for handling any given amount of power. However, as is well known in the field, the concentration of load on gear teeth is a limitation for any given gear transmission. High local concentration of load on these teeth is not permitted. Accordingly, where high power must be handled by a gear transmission the gear teeth must be broadened to increase the area over which the load is transmitted. For this reason it has not been commercially feasible, for example, to operate airplane turbine gear reductions at powers greater than about 5,000 H.P., this despite the fact that turbines with powers as high as 20,000 H.P. are in service in jet engine systems. A similar problem arises in gear reductions that are utilized in ships, it having been necessary up to now to employ extremely massive gears to transmit the very high power that is present. In accordance with my invention, however, and particularly in accordance with the foregoing object, power limitations are greatly raised, tooth loading problems no longer are present, and I am able to construct a relatively light, small transmission for extremely large power requirements.

Other objects of my invention will in part be obvious and will in part be pointed out hereinafter.

My invention accordingly consists in the features of construction, combinations of elements and arrangements of parts which will be exemplified in the transmissions hereinafter described and of which the scope of application will be indicated in the appended claims.

In the accompanying drawings in which are shown various possible embodiments of my invention.

In general, I carry out my invention by angularly adding or superimposing a plurality, i.e., two or more, of discontinuous motions in the proper quantities and phase relationships within a repeating cycle to provide a smoothly integrated continuous output when the input rotational velocity is smooth and continuous.

More particularly, I carry out my invention by providing two rotatable members which may be considered, under a given set of circumstances, as the input member and the output member of the transmission, and by connecting these members with a plurality of elements constituting at least two overrunning coaxial unidirectional clutches of which each clutch includes two overrunningly unidirectionally mutually engageable elements so that the clutches can be considered as providing two sets of elements of which each set includes at least one element of each clutch, the elements of each set being kinematically alike and the elements of the two sets being kinematically different. The clutches themselves are identically kinematically unidirectionally oriented. A means inter-connects all of one set of elements for common rotation with one another and with one of the rotary members mentioned above, and another means kinematically interconnects all of the second set of elements with the other rotary member for intermittent successive substantially overlapping actuation with the individual elements of the second set experiencing substantial uniform angular velocities at moments of succession, its being assumed that the said one rotary member is turning at a uniform, smooth and continuous velocity.

The basic principle of my invention is best explained by reference to FIG. 1 in which the essential working parts of a simplified transmission are shown, all bearings, supporting structures and housings being omitted in the interest of clarity.

The reference numeral 20 indicates the input shaft, which may derive rotation from any suitable source of power, such as an electric motor, steam turbine, or the like. Mounted to axially slide readily on the shaft 20 is an asymmetrical frustoconical cam 22 which is constrained to rotate with the shaft 20 by splines 24 formed on the shaft. Cam followers in the form of rollers 26, of suitably curved surface contour, are mounted to engage the surface of the cam 22, being held in contact therewith at all times by springs 28. Lever arms 30, on which the rollers 26 are rotationally mounted, are operationally integral with the shafts 32 and the levers 34, the latter being angularly displaced from the levers 30. Rotationally mounted on the levers 34 are rollers 36 which engage the clevis ends of radial driving arms 38, 40. The two rollers 26 and the entire linkages connected with them are preferably located approximately diametrically opposite one another.

The arm 38 is operationally integral with a shaft 42 which passes freely through a hollow coaxial shaft 44, the latter being operationally integral with the arm 40. Fixed to the end of the shaft 42 is a collar 46 on which is pivoted a pawl 48. Similarly pivoted on the hollow shaft 44 is a second pawl 50. Both of the pawls 48, 50 are spring loaded to engage the inner toothed surface 49 of a common ratchet cylinder 52. Each of the pawls 48, 50 is arranged in the usual manner to turn the ratchet cylinder when swung in one direction, and to slide freely relative thereto when swung in the opposite direction as is conventional in pawl and ratchet operation. The ratchet cylinder 52 also constitutes the output shaft, being attached to any suitable extension adapted to transmit its rotary motion to any power absorptive device or mechanism which is to be driven by the transmission.

The cam 22 is formed with its small end 54 circular and concentric with the axis of the shaft 20, while the cross-sections thereof become progressively more eccentric toward the larger end 56 of said cam. As shown, the aforesaid eccentricity is developed by maintaining one side parallel with the axis of the shaft 20 while inclining the other side thereto. The cam 22 may, however, equally effectively be generally cylindrical in form with its axis inclined to the shaft axis, or any other form may be given it which will produce the progressive eccentricity desired. Means also is included for sliding the cam 22 axially on the shaft 20, but for simplicity the same is omitted from FIG. 1.

In operation, it will be noted that when the cam 22 is in the position shown (approximately 90° away from the zero position of the shaft 20 that arbitrarily is assumed to be the position in which a given one of the rollers 26 engages the side of the cam parallel to the axis of the shaft 20), one of the rollers 26 has been forced radially away from the shaft axis by the eccentric cam rise, while the opposite roller 26 has been urged toward the said axis by its spring 28, having been allowed to move in that direction by the fall of the cam 22. Being diametrically opposite each other, one of the rollers moves outwardly from the shaft 20 while the other moves inwardly and throughout the entire revolution of the shaft 20 one or the other of the rollers at all times moves outwardly.

The oscillating motion of the rollers 26 thus produced, is transmitted by levers 30, 34, shafts 32, arms 38, 40 and shafts 42, 44 to pawls 48, 50, which thereby are caused to oscillate in opposite phase by constant rotation of the input shaft 20. Each of the pawls 48, 50, as it moves in the direction of the arrow 58, carries with it the ratchet cylinder 52; while as it moves in the opposite direction it brushes freely over the teeth of the cylinder, thus allowing the cylinder 52 to continue rotation under the torque applied by the other pawl. Therefore when shaft 20 is rotated continuously in the direction of the arrow 60, the shafts 32 oscillate as indicated by the arrows 62 and the cylinder 52 revolves continuously in the direction of the arrow 58, which is for the arrangement shown, the same rotational direction as that of the input shaft 20. It will be observed that the axes of rotation of the shaft 20 and the cylinder 52 are in alignment.

In order to assure that the rotational velocity of the cylinder 52 is constant when that of the input shaft 20 is constant, the invention provides that the effective angular increment of cam rise is constant over the driving semi-circumference of the cam. The other portion of the cam contour, affecting only the return of the rollers, has no effect on the action and may therefore vary considerably in form.

Figure 22:
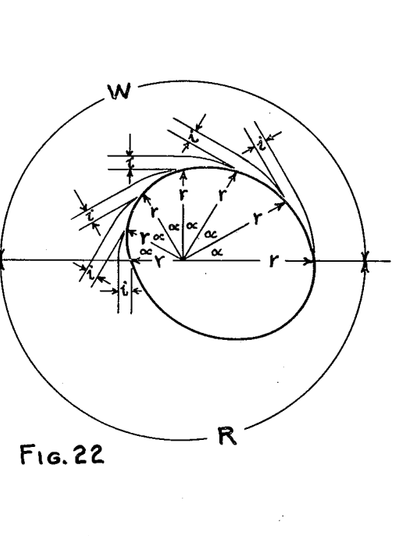
FIG. 22 is a face view showing the typical contour for a cam utilized in the practice of my invention.

In FIG. 22 I have shown an ideal cam shape for a typical cross-section of the cam 22. It will be observed that in the working semi-circumference W the radii $r$ at successive equal angles $\alpha$ have an increment $i$ which is equal. However, in the return semi-circumference R the shape is not critical, but should provide a smooth return to the other end of the working semi-circumference. It will be understood that as mentioned hereinafter, this shape of the working semi-circumference is varied in practice to cancel out the effect of non-uniform transmission of motion in the various other kinematic elements involved, so that with the correction thus afforded by the cam a constant substantially uniform angular velocity will be obtained for the cylinder 52 when the shaft 20 is rotated at a substantially constant angular velocity. It furthermore should be pointed out that by virtue of this arrangement, when one of the pawls ceases its driving operation and is ready to begin its retrograde stroke, the other pawl the driving action of which is now beginning to be effective and is substantially overlappingly actuating the cylinder 52, is travelling at substantially the same angular velocity as the pawl which is just terminating its driving action.

Figure 1:
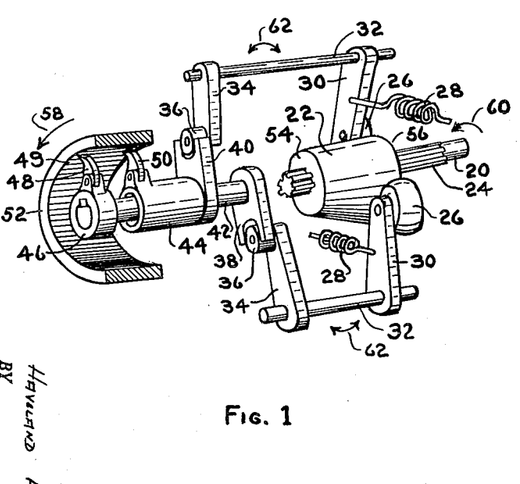
FIG. 1 is a perspective diagrammatic view of one form of variable speed transmission constructed in accordance with my invention, said transmission being illustrated in its simplest form and with certain parts omitted and other parts partially broken away in order better to illustrate the fundamental principle of my invention.

While in the diagrammatic representation of FIG. 1 a toothed ratchet with cooperating pawls is shown for simplicity of exposition, in practice it generally is preferable to substitute a continuously contacting form of ratchet known commercially as the "overrunning clutch," which is in effect a ratchet with an infinite number of teeth. With the overrunning clutch type of ratchet there is no shock at engagement since the pawls or sprags of the clutch can engage at the exact instant of attaining the rotational speed of the driven cylinder. Thus, rotation is always precisely continuous and uninterrupted. By way of example, but not limitation, two typical commercial overrunning clutches which can be utilized in connection with my invention as aforesaid are the clutch known as "Formsprag" clutches sold by the Formsprag Company of 23601 Hoover Road, Van Dyke, Michigan, typical clutches being shown in their catalog 104–C of September 1956; and the clutch known as the "Morse" cam clutch, series PB, sold by the Morse Chain Company of Ithaca, New York, a division of Borg Warner, typical clutches being shown in their sheet C11–56B of December 1956.

The rate of rotation of the cylinder 52 and its attached output shaft (not shown) is different from that of the input shaft 20 whenever the sum of the driving arcs of the two pawls 48, 50 is different from one revolution. The length of each of these driving arcs, it is apparent, is dependent on the height of the rise of the path traversed by the rollers 26 on the cam 22. Thus, when the cam is in a position which causes the rollers 26 to traverse its large end 56, a large driving arc is imparted to each of the pawls, while moving the cam axially to bring the rollers in contact with the circular small end 54 reduces the driving arc of each pawl to zero. In this latter condition rotation of the shaft 20 produces no rotation whatever of the cylinder 52. The reduction ratio, which is the ratio of the rotational speed of the input shaft 20 to that of the output shaft represented by the cylinder 52, is therefore infinity. On the other hand, sliding the cam 22 to the position of FIG. 1 with its large end engaging the rollers produces a finite ratio which is the minimum attainable with the proportions shown. This minimum ratio is dependent only on the rise given to the large end 56 of the cam 22, the relative lengths of the levers 30, 34 and the lengths of the arms 38, 40. Moving the cam 22 axially to the right (as viewed in FIG. 1) increases the reduction ratio continuously, without stepped gradations and without interrupting the flow of power, to provide any ratio between the minimum ratio of the specific design and infinity. To have the rotation completely uniform in each intermediate position the cam is formed with the effective rise increments constant, as noted above, over the working approximate half circumference for every intermediate roller contact track.

The correct cam form may be obtained either analytically or graphically. The basic theoretical roller track form is that of the spiral of Archimedes. However, deviations are introduced, in accordance with well known kinematic theory, to compensate for the roller diameters, the forms of the roller face and the angularities of the levers 30, 34 and the arms 38, 40. Graphically, all these influences are readily taken care of by layouts of the parts in the various positions corresponding to uniform output shaft rotation for uniform input shaft rotation.

Since the bearings of the shaft 20, the rollers 26, the shafts 32, the rollers 36, the shafts 42, 44 and the cylinder 52 may all be of rolling anti-friction type, there need be substantially no sliding friction. Consequently, the efficiency is very high in comparison particularly with geared speed reducers which unavoidably are subject to some sliding between gear teeth.

Figure 2:
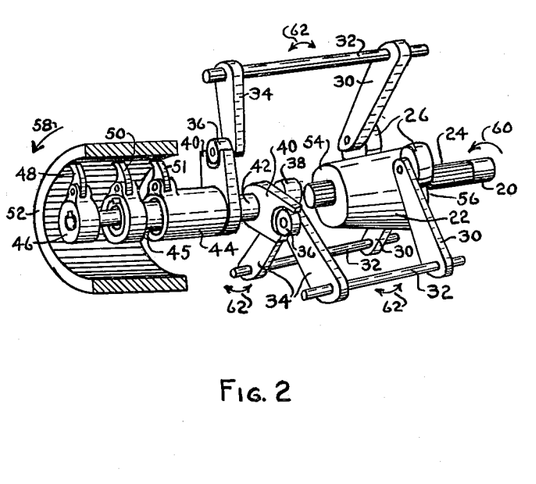
FIG. 2 is a view similar to FIG. 1, but showing a modified form of my invention.
Figure 3:
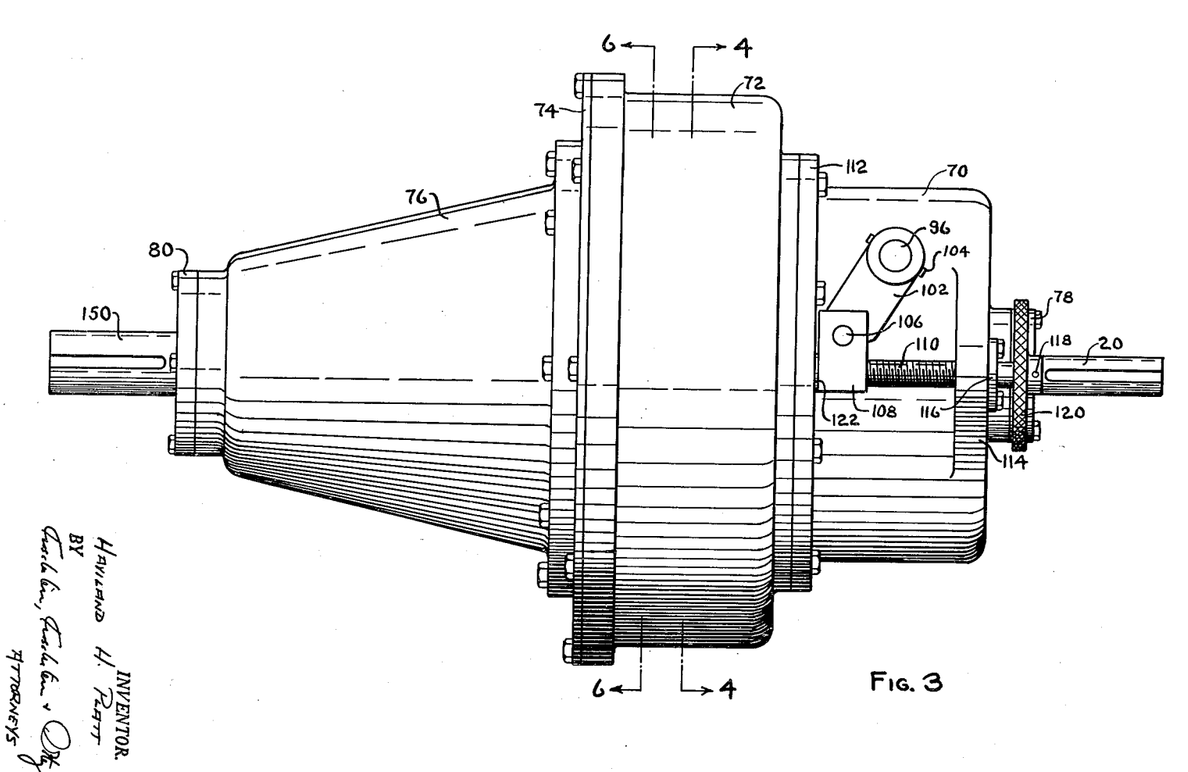
FIG. 3 is a side elevational view of a more complex form of transmission embodying my invention, this transmission including all of the basic parts illustrated in FIG. 1.

The number of cam followers 26 shown in FIG. 1, namely two, is the minimum through which the principle of my invention utilizing the continuous combination of reciprocating motions to produce a smooth continuous integrated rotation can be attained. There is no limit however to the maximum number. Thus, in FIG. 2 I have illustrated a transmission like that of FIG. 1 but wherein there are employed three cam follower rollers 26, three sets of levers, arms and shafts and three spring loaded pawls 48, 50 and 51 engaging a common ratchet cylinder 52. The rollers and linkages are equally angularly spaced about the input shaft 20 with the consequence that the driving motion of each must take place over only one-third rather than one-half of each revolution of the input shaft. The uniform rise of the cam 22 is therefore arranged to cover approximately one-third of the circumference of each roller track, i.e. one-third of the circumference of the cam, the balance being utilized for the spring-actuated return motions of the rollers. (The springs 28 have been omitted from FIG. 2 to avoid confusion of lines.) There are, for this arrangement two hollow shafts 44 and 45 concentrically disposed about the shaft 42 for connecting the three pawls 48, 50 and 51 to the three arms 38, 40 and 41. The main reason why the triple system of FIG. 2 is for some applications more advantageous than the simpler type of FIG. 1 is that lower minimum reduction ratios may be attained with similar linkages. Thus, with the same over-all cam rise, the arrangement of FIG. 2 yields one and one-half times as many revolutions of the output shaft as does the arrangement of FIG. 1. Therefore, for example, if a minimum ratio of three-to-one is attainable with the linkage of FIG. 1, the corresponding ratio of that of FIG. 2 is two-to-one. Obviously there is no definite limit to the number of acting linkages and therefore no limit to the reduction of minimum ratio that is possible.

In FIGS. 3, 4, 5 and 6 I have illustrated one presently preferred commercial form of transmission unit embodying the principle described above in connection with FIG. 1.

The supporting and enclosing casing, which may be secured to a suitable base or stand by a bracket or the like, not shown, is composed of the four members 70, 72, 74, 76 with two end closure plates 78, 80. The input shaft 20 is supported in the two anti-friction bearings 82, 84, the bearing 82 supported in the casing member 70 being a ball bearing and the bearing 84 supported in the casing member 74 being of the needle roller type. The input shaft 20 is retained axially by a snap-ring 86 and collar 87 on opposite sides of the inner race of the bearing 82.

The cam 22, which is formed with the small end 54 circular and the large end 56 eccentric, is axially slidably mounted on the input shaft 20, being contrained to rotate therewith by splines 24 which engage meshing axial grooves in the bore of the cam. The cam 22 is formed with an integral flange 88 spaced from the large end 56 to form an annular channel 90. Adapted to ride freely on both side walls of the channel 90 are two rollers 92 (FIG. 5) rotatably mounted in a yoke 94 (FIG. 4) which is secured to a cross shaft 96 by a pin 98. The shaft 96 is rotatably supported in lugs 100 formed on the casing member 70. For high speed operation it is desirable that cam 22 be dynamically balanced. This may be accomplished by drilling holes such as 124, 126 in the heavy side of the cam. On one of the protruding outer ends of the shaft 96 a forked lever 102 is secured by a pin 104. The bifurcated end of said lever 102 is arranged to engage slidably a pin 106 fixed in a slotted nut 108 which is internally threaded to mesh with a lead-screw 110. The lead-screw is supported in bearing holes in a flange 112 and a lug 114 both of which are formed integrally with the casing member 70. Said lead-screw is restrained against axial movement by a plate 116 bolted to the lug 114 and engaging a collar (not shown) integral with the lead-screw. Secured on the end of the lead-screw by a pin 118 is a manually operable knurled adjusting disc 120. A washer 122 may be provided between the nut 108 and the flange 112 to act as a limit stop for the travel of said nut, its thickness being selected to limit the travel at any desired position.

Figure 4:
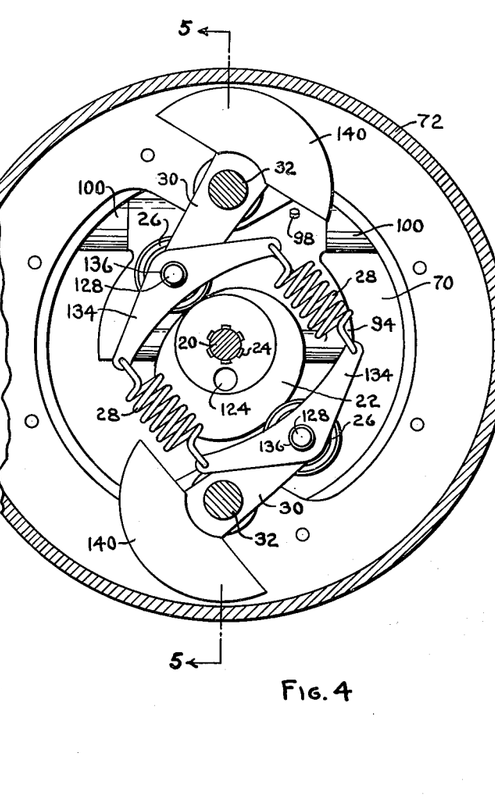
FIG. 4 is a transverse sectional view taken substantially along the line 4—4 of FIG. 3 and illustrating the interengaging cam and cam followers which constitute two important elements of my invention.
Figure 5:
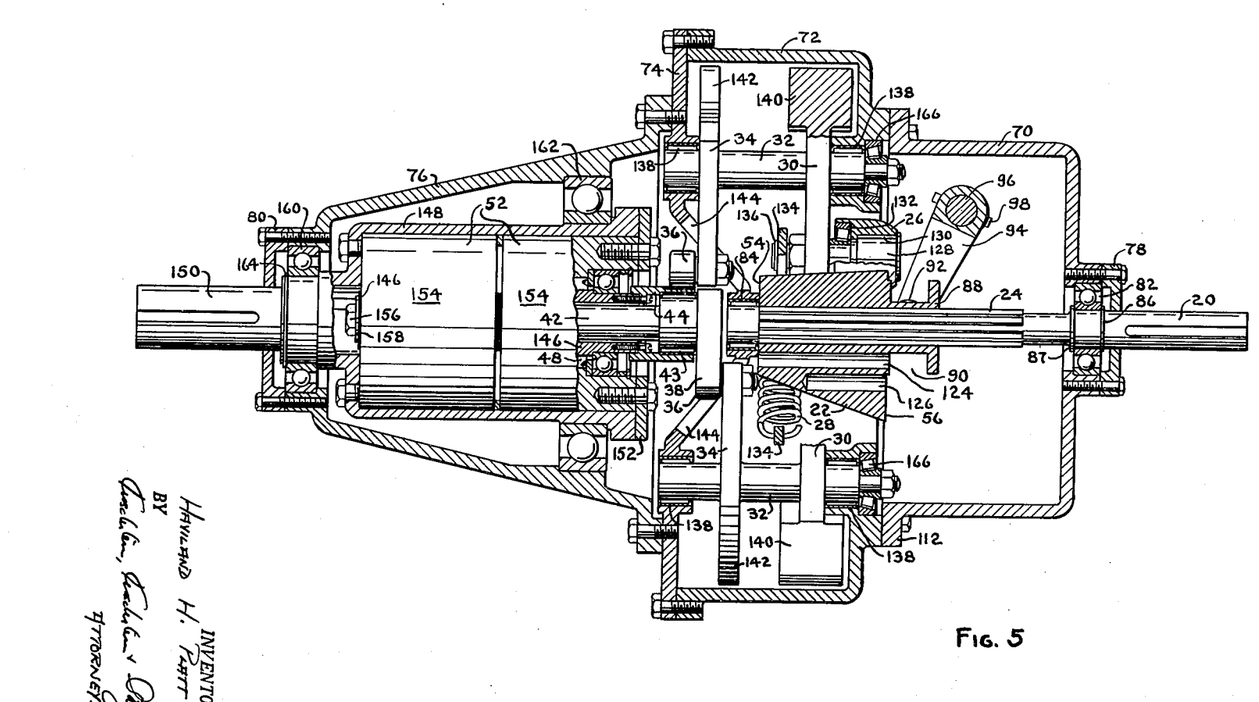
FIG. 5 is a longitudinal vertical sectional view taken substantially along the line 5—5 of FIG. 4.
Figure 6:
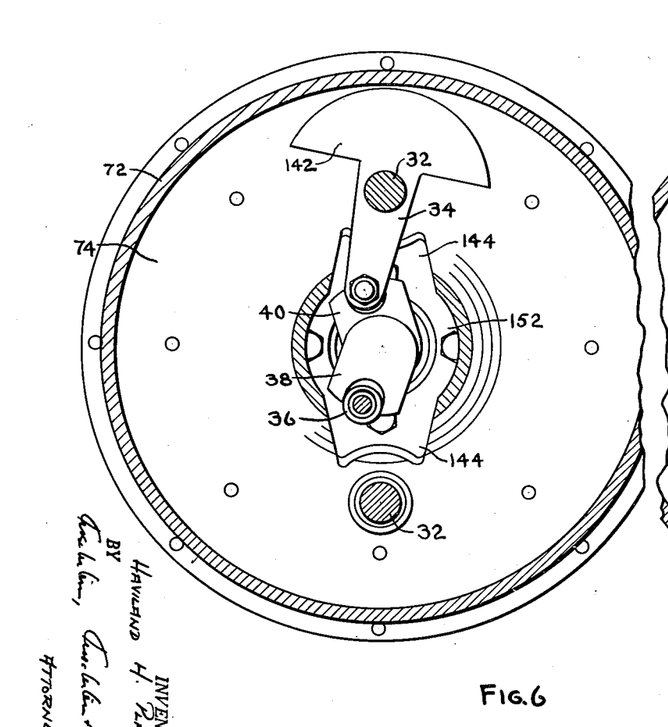
FIG. 6 is a transverse sectional view taken substantially along the line 6—6 of FIG. 3 and illustrating the intermittent drives for the unidirectional clutches which constitute other important elements of my invention.

Turning the disc 120 causes the nut 108 to move axially on the lead-screw, thereby swinging the lever 102, rotating the shaft 96, swinging the yoke 94 and causing the cam 22 to slide axially along shaft 20. Thus the cam 22 may be adjusted to take up any desired position between the limits determined by the clearance between the casing members 70 and 74 or the travel allowed to the nut 108. The adjustment may be made readily regardless of the rotation and torque being applied to the input shaft 20. Furthermore, the lead-screw, nut and adjusting disc combination provide a micrometer type of action which assures exceedingly fine gradations of adjustment.

In FIG. 5 one of the rollers 26 is shown partially sectioned in order to show its internal construction. The portion of the roller 26 which engages the cam 22 is spherical in outer form while the remainder of the outer surface is cylindrical. The roller constitutes a shell that is supported on a stud 128 that is parallel to the input shaft and is securely bolted to the lever 30, the main radial load being carried by the needle rollers 130 on which the shell turns about the stud, while the axial thrust produced by the inclination of the surface of the cam 22 and a portion of the radial load are assumed by a tapered roller bearing 132 likewise interposed between the shell and stud.

The arrangement of the springs 28, as shown particularly in FIG. 4, permits the interconnection of the rollers 26 by the springs so that the spring deflection is only that of the difference between the displacements of the two rollers rather than the total displacement of each, as the arrangement of FIG. 1 would require. Furthermore, the sum of the forces of both springs is applied to both rollers, the requisite size and weight of the springs being thereby reduced. For this purpose two equalizers 134 are freely rotatable on the studs 128, being retained by snap-rings 136. Antifriction bearings, such as needle rollers, are preferably provided for the mounting of the equalizers 134 on said studs.

The levers 30, which carry the rollers 26, and the levers 34 carrying the rollers 36 are operationally integral with the shafts 32 that turn in needle roller bearings 138 supported in the casing members 72, 74, the end thrust being absorbed by tapered roller bearings 166. Integral with, or fixed to the levers 30 and 34 are counterweights 140, 142, respectively, to provide a substantial rotational balance for these oscillating members. When only low speed operation is contemplated the counterweights may be omitted. Openings 144 in the casing member 74 provide clearance for the operative engagement of the rollers 36 with the clevis ends of the radial driving arms 38, 40.

In lieu of the rachet assembly of FIG. 1 two like overrunning sprag clutches 154 of the conventional construction hereinabove referred to, with outer cylindrical shells 52, are provided. Both clutches have their sprags or pawls 48 disposed so as to transmit torque when their inner clutch members 146 are rotated in the direction of the arrow 58 of FIG. 1 and to slide freely during the retrograde rotation of said members. The clutches 154 are located in a hollow cylindrical receptacle 148 which is an extension of an output shaft 150. One clutch shell 52 is bolted directly to an end wall of the receptacle 148 and the other to an anchor plate 152 which is in turn bolted to the receptacle 148. Thus the two outer shells 52 are operationally an integral unit corresponding to the single cylindrical shell 52 of FIG. 1.

The shaft 42 carrying the arm 38 extends freely through the inner member 146 of one clutch 154 (the right-hand clutch as viewed in FIG. 5) and is keyed to the inner member of the outer clutch (the left-hand clutch as viewed in FIG. 5), said shaft being supported in needle roller bearings 43 and being retained axially by a bolt 156 and a washer 158. The output shaft 150 is journalled in the casing member 76 by ball bearings 160 and 162 and is retained axially by a snap-ring 164.

For convenience of assembly, the hollow shaft 44 that carries the radial driving arm 40 is bolted to the inner member of the right-hand clutch 154 in any suitable manner such, for example, as that shown.

The operation of the transmission shown in FIGS. 3, 4, 5 and 6 is identical to that outlined with respect to FIG. 1, the overrunning clutches 154 being in effect ratchets with an infinite number of teeth. Thus there is provided a transmission, having rolling contacts throughout, which is mechanically positive and which provides a continuously adjustable reduction raito, with power on or off, between infinity and the minimum value allowed by the particular design, which for the proportions illustrated is approximately five to one.

Figures 7, 9, 10:
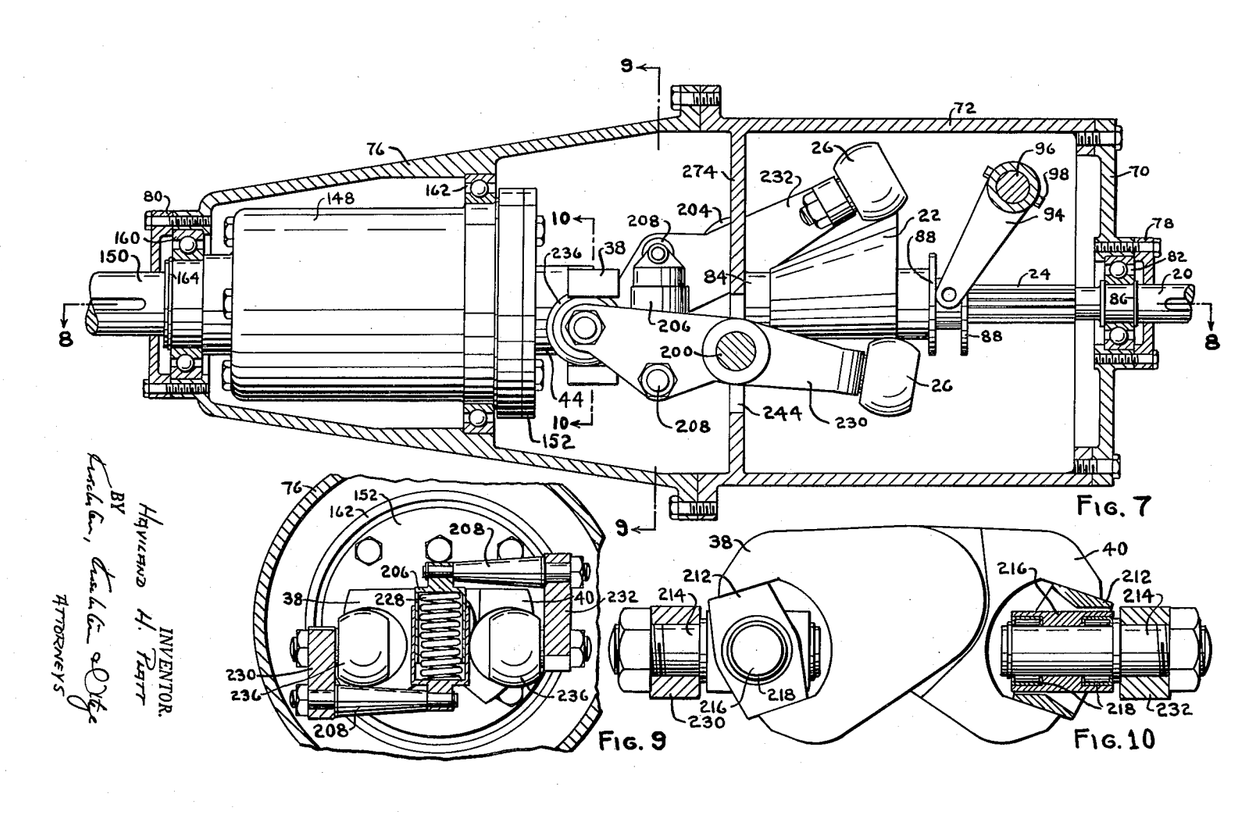
FIG. 7 is a view similar to FIG. 5 of a variable speed transmission embodying a modified form of my invention.
FIG. 9 is a transverse sectional view taken substantially along the line 9—9 of FIG. 7 and showing the modified form of biasing means for the cam followers utilized in this form of my invention.
FIG. 10 is a detail of another modified form of my invention, the same illustrating a variation in the intermittent drives for the unidirectional clutches; for the purpose of clarification, I have by a second line 10—10 in FIG. 7 indicated the location of this variation, although it will be understood that the same is not incorporated in the embodiment of FIG. 7 and is to a larger scale.
Figure 8:
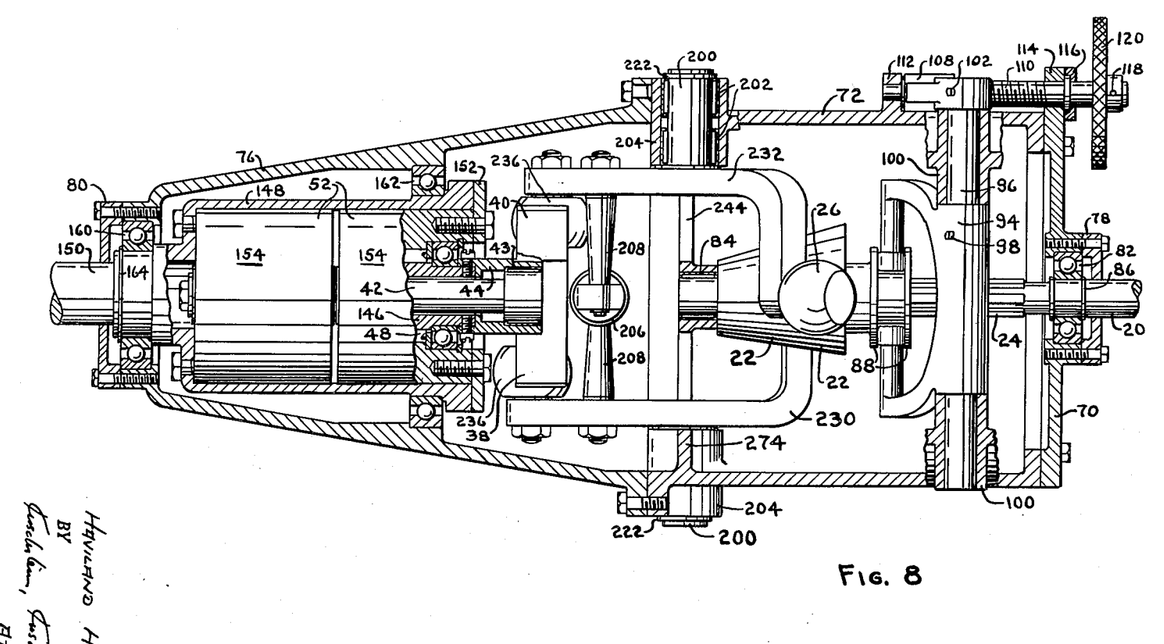
FIG. 8 is a longitudinal horizontal sectional view taken substantially along the line 8—8 of FIG. 7.

The linkage interconnecting cam 22 and the radial driving arms 38, 40 may be varied widely in arrangement. One such variation is illustrated in FIGS. 7, 8 and 9. In this alternative construction the out-of-phase immediately successive displacements imparted to the rollers 26 are conveyed to the driving arms 38, 40 directly by levers 230, 232 which are supported on stub shafts 200 that are journalled in needle roller bearings 202 housed in eyes 204 integral with the casing member 72 and retained by snap-rings 222. The rollers 26 are supported on the ends of said levers with the axes of rotation of the rollers parallel to the longitudinal axes of the levers. These ends of the levers are angled inwardly to place the two rollers in diametrically opposed relationship with their axes of rotation in the median plane at right angles to the lever pivot axes. As will be seen from FIG. 7, with the orientations resulting from this construction there is at no time a large component of axial thrust on the rollers 26, which therefore do not require additional bearings for thrust assumption. The other ends of the levers 230, 232 carry rollers 236 (corresponding to the rollers 36 of FIG. 1) which are formed in the arrangement of FIGS. 7, 8 and 9, with spherical contact surfaces that nicely fit within the forked ends of the radial driving arms 38, 40, said forked ends being offset and shaped to provide surfaces wide enough and of the proper contour to maintain contact with the rollers and to traverse the axial component of motion of the rollers 236 resulting from the changing angularities of the levers 230, 232.

The means for urging the rollers 26 against opposite sides of the cam 22 constitutes a single compression spring contained within a telescopic capsule 206 that is pivotally supported at its ends on posts 208 bolted to the levers 230, 232. The remaining parts of the transmission shown in FIGS. 7, 8 and 9 are substantially similar to their counterparts in the transmission of FIGS. 3, 4, 5 and 6 and are marked with the same reference numerals. It may be noted however that the bearing 84 for the inner end of the input shaft 20 is supported in a transverse flange 274 integral with the casing member 72 and taking the place of the separate casing member 74. The flange 274 is apertured at 244 to allow assembly and operation of the levers 230, 232. Moreover the attachment of the hollow shaft 44 to the clutch member 146 is slightly different to illustrate an alternative construction for this detail.

The chief advantage of the arrangement of FIGS. 7, 8 and 9 is that the levers 230, 232 may be balanced without resort to counterweights, the result being a material reduction in diameter and weight. However, the ideal of complete rolling contacts throughout is slightly compromised in that the rollers 236 necessarily have a component of sliding in the arms 38, 40. This defect can be minimized by substituting for the rollers 236 the construction illustrated to an enlarged scale in FIG. 10. Parallel-sided blocks 212, engaging the jaws of driving arms 38, 40 are supported on the levers 230, 232 by studs 214 and Cardan cross members 216 containing needle roller bearings 218 on both axes. By this means the sliding of the rollers 236 due to angular displacements is eliminated, leaving sliding only for the translational displacements which are smaller. Also, greater bearing areas are provided for the remaining sliding motion.

Figure 11:
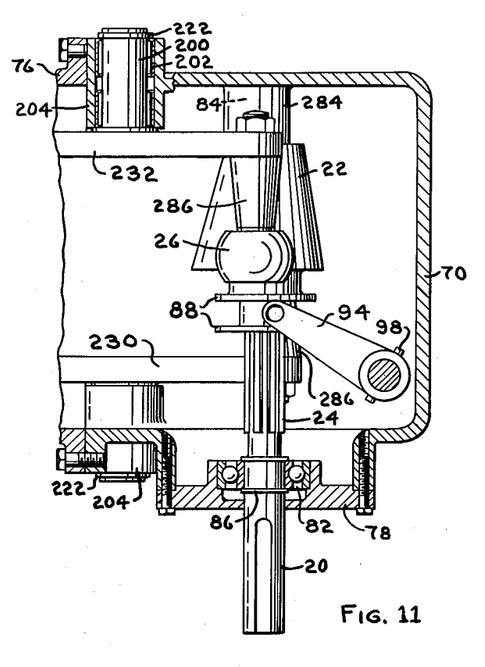
FIG. 11 is a fragmentary view similar to FIG. 8 of another form of my invention showing a modified arrangement of cam which orients the input and output members of the transmission in relative angular relationship.

For some transmission applications it is required that the input and output shafts be angularly related to one another instead of being aligned or parallel. The present invention lends itself readily to the provision of such angle drives. As an example, FIG. 11 shows the input portion of a transmission similar to that of FIGS. 7, 8 and 9, but with the input and output shafts forming a ninety degree angle. The construction and operation are not materially different and the parts are accordingly marked with reference numerals corresponding to those of FIGS. 7, 8 and 9.

In order to create the desired right-angled relationship between the input and the output shafts, I have changed the positions of the input shaft 20 and the cam 22 as well as the configuration of the arms 230, 232. Thus, from inspection of FIG. 11 it will be seen that the input shaft 20 is located in a position ninety degrees away from the position shown in FIG. 8 so that it is, in effect, disposed athwart the transmission casing rather than in line therewith. Therefore, the bearings 82, 84 in which the input shaft 20 is journalled are located on the side walls of the casing member 72 rather than on an end wall and a transverse flange. One end of said shaft 20 is journalled in the ball bearing 82 which is supported in the end plate 78 instead of casing member 70 and the other end of the input shaft is journalled in the bearing 84 which is supported in a lug 284 integrally formed on the inside of the casing member 70 so that the transverse flange 274 is not needed. The cam 22 is located with its axis of rotation coincident with the axis of rotation of the input shaft so that it presents a different aspect to the rollers 26 than does the cam 22 in the FIG. 8 form of my invention. Instead of angling in the ends of the levers 230, 232, I utilize posts 286 secured to the input ends of the levers 230, 232 and rotatably mount the rollers 26 on said posts.

Figure 12:
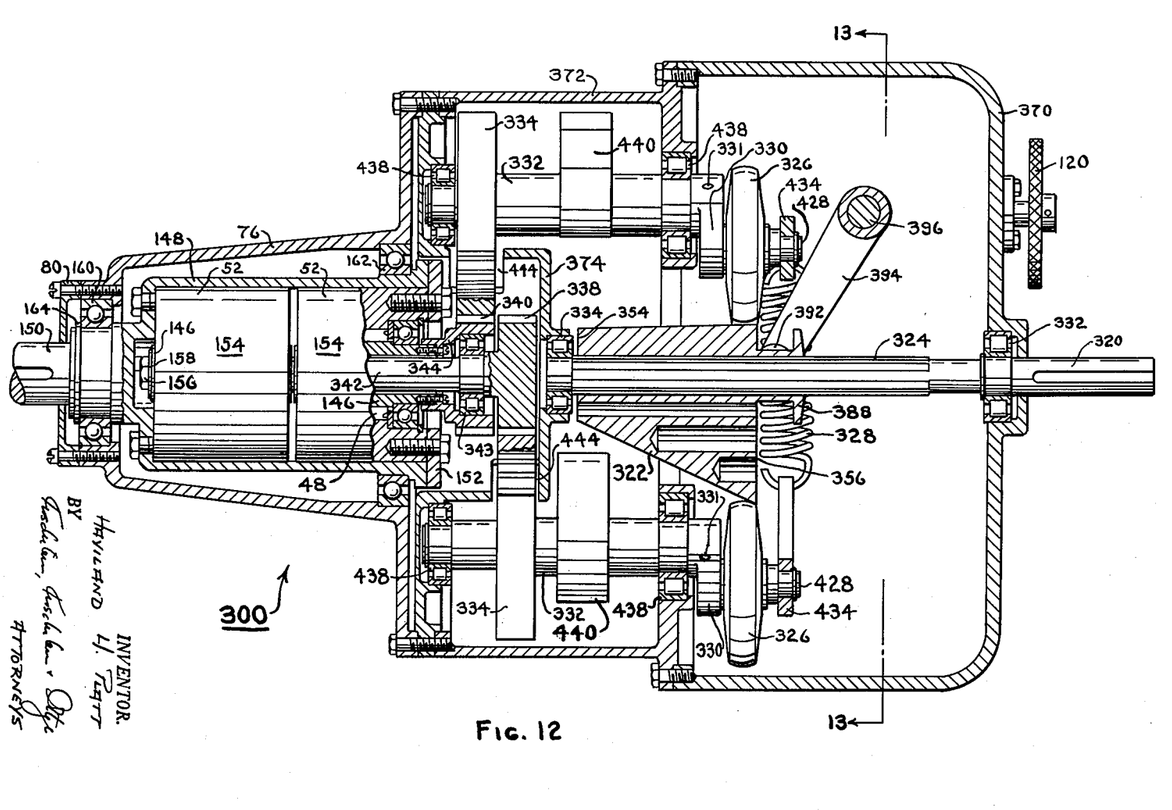
FIG. 12 is a view similar to FIG. 5, illustrating another form of my invention which differs from the forms previously shown in that it enables a lower minimum reduction ratio to be secured.
Figure 13:
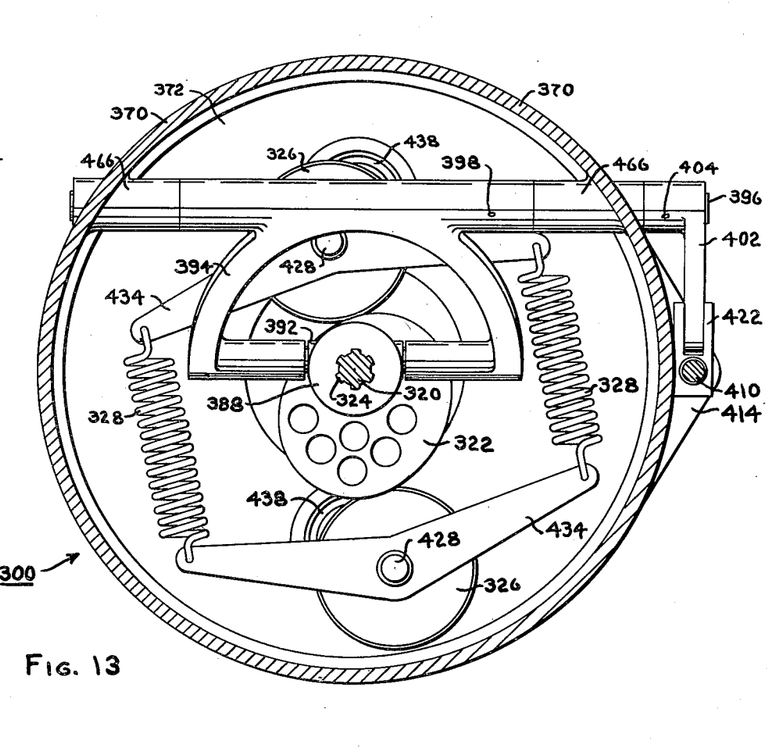
FIG. 13 is a sectional view taken substantially along the line 13—13 of FIG. 12.

The embodiments heretofore illustrated and described are limited as a practical matter to a rather large minimum reduction ratio. For some transmission uses a smaller minimum ratio is required. This can be obtained in various ways, one way for example, being the use of fixed ratio gearing external to the variable ratio transmission unit of my invention. Thus, for example, if a minimum ratio of one-to-one is desired, the transmissions of FIGS. 3 and 7 can serve the requisite purpose if, for instance, a one-to-five fixed ratio step-up gearing is inserted either at the input or output end. However, I may employ internal means, i.e. means within and forming part of my unit to attain the same result with greater economy of space. An arrangement of my invention which provides a transmission 300 having a minimum ratio of approximately one-to-one and a maximum ratio of infinity to one is illustrated in FIGS. 12 and 13.

The input shaft 320 of said transmission 300 is formed with splines 324 and is supported in roller bearings 332 and 334 retained respectively in a casing member 370 and a bearing support plate 374 fast on a casing member 372. Slidably mounted on the shaft 320 is a cam 322 constrained to rotate therewith by the splines 324. The small end 354 of said cam is concentrically circular while the large end 356 is eccentric and of a contour to produce a substantially constant effective cam rise increment over approximately one-half its circumference, the total cam rise being proportionately substantially greater than that of cam 22 of FIG. 5. A flange 388, roller 392, yoke 394, cross-shaft 396, pin 398, lugs 466, pin 404, lever 402, nut 422, lead-screw 410 and lug 414 serve the same function of adjusting the axial position of the cam 322 as do the corresponding parts of the transmisions previously described.

Rollers 326, of larger diameter than those of the previously described transmissions, are arranged to follow the cam 322 and remain in contact therewith. The rollers preferably are lightened by drilling or by being of hollow construction. Said rollers are supported on levers 330 pinned at 331 to shafts 332 which have integrally formed with them, or fixedly attached thereto, counterweights 440 and balanced gear segments 334. The shafts 332 are supported in bearings 438 retained in the casing member 372 and on the bearing plate 374. The rollers 326 are maintained in contact with the cam 322 by tension springs 328 acting through equalizers 434, which latter are rotationally supported on pivot studs 428 integral with the levers 330. The teeth of the gear segments 334 are arranged to mesh with those of pinions 338, 340 formed on the shafts 342, 344 respectively, the inner shaft 342 being supported in the hollow shaft 344 by a roller bearing 343. Apertures 444 cut in the bearing plate 374 provide clearance for meshing engagement of said gear segments 334 and pinions 338, 340. The parts and their arrangement at the output end of the transmission are substantially identical with the corresponding parts of FIG. 5 and are indicated by the same reference numerals.

By virtue of the larger cam diameter, the larger roller diameter and the shorter lever length, the rollers 326 in the unit 300 have a far greater angular stroke than do the rollers 26, the maximum angular oscillation of the shafts 332 being consequently approximately ninety degrees. In order to transmit satisfactorily this augmented angular stroke the gear segments 334 and the pinions 338, 340 have been substituted for the levers 34 and the radial driving arms 38, 40. Since the pitch diameter of the segments 334 is, as shown, twice that of the pinions 338, 340 the angular strike of the shafts 342, 344 is twice that of the shafts 332, namely approximately one hundred and eighty degrees. Therefore, during one revolution of the input shaft 320 each of clutch shells 52 is turned in the operating direction through one-half a revolution and consequently the output shaft 150 turns through substantially one complete revolution, whereby the minimum reduction ratio is about one-to-one.

If desired, the minimum ratio can be reduced still further by any of the following expedients: change in ratio of the gear segments to the pinions; substitution of segment and pinion drives from the rollers 326 to the shafts 332; alternatively substituting rack and pinion drives for the same function; and increasing the number of clutches and their driving trains, as illustrated in FIG. 2. Thus it is clear that the invention may, if required, provide transmissions having minimum ratios of one-to-two, one-to-three, one-to-four, or even smaller while retaining always the maximum ratio of infinity to one.

The infinite ratio serves a very useful purpose in that it provides in effect a disengagement of the drive and thus obviates the need for a separate disengagement clutch usually incorporated in the input shaft line. However, if disengagement is not required and very high ratios are not wanted the transmissions of my invention may be made with shortened cams having noncircular small ends to yield any desired maximum ratio.

Figures 14, 16, 17:
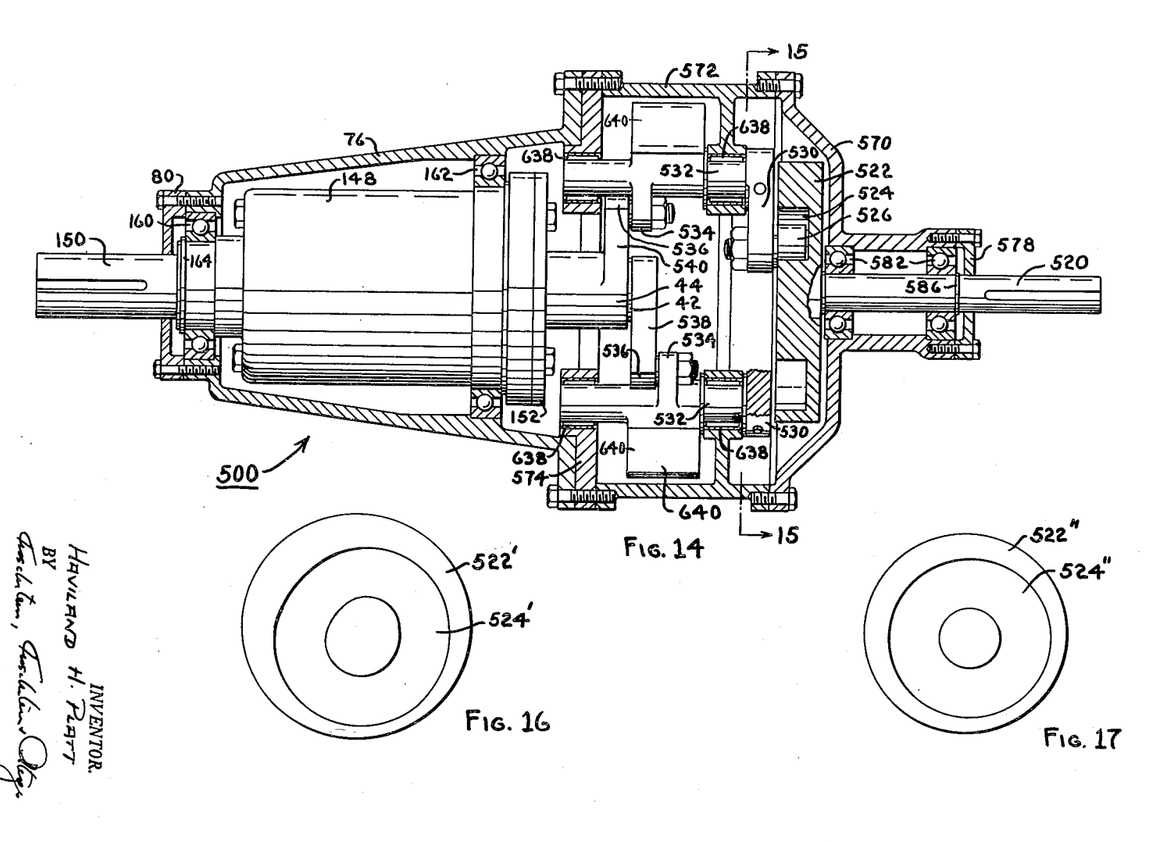
FIG. 14 is a view similar to FIG. 5 of another form of my invention wherein there is provided a fixed ratio speed transmission having a moderately high reduction ratio.
FIG. 16 is a diagrammatic view of another cam which may be utilized in said last form of my invention where a high reduction ratio is required.
FIG. 17 is a view similar to FIG. 16 showing another form of cam which secures a still higher reduction ratio.
Figure 15:
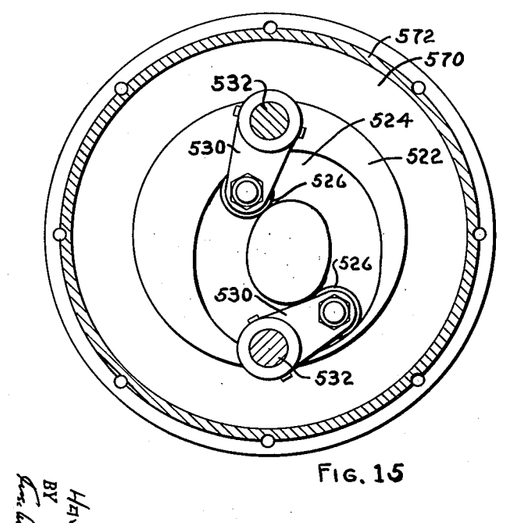
FIG. 15 is a sectional view taken substantially along the line 15—15 of FIG. 14 and principally illustrating the internal cam utilized in this last mentioned form of my invention.

In addition to the advantages attained by the invention in the field of variable ratio transmissions it affords a material improvement in fixed ratio transmissions, particularly for high reduction ratios. The arrangement of one preferred form of transmission 500, according to the invention, having a high fixed reduction ratio is illustrated in FIGS. 14 and 15. In general the elements of the mechanism are similar to those illustrated and described for the variable ratio embodiments. The chief essential differences are that no springs are required, since a closed cam track with a positive return can be used, and that the cam follower rollers may have the conventional cylindrical contour instead of the double curvature needed to follow a tapered cam.

The transmission 500 includes a drive cam 522 of the disc type with a cam track 524 cut in one of its faces, and is formed integral with, or otherwise secured to, an input shaft 520 which is supported in ball bearings 582 seated in a casing member 570 and retained by a snapping 586. For high-speed operation the cam 522 may be balanced by removing material from the side opposite the maximum cam rise. Cylindrical cam follower rollers 526 ride nicely within the cam track 524 and are mounted for rotation relative to and for oscillation with levers 530 pinned to shafts 532 which are supported in needle bearings 638 seated in a casing section 572 and a bearing plate 574. Formed integrally with the shafts 532 are counterweights 640 and the short levers 534 which carry rollers 536 engaging the forked ends of radial driving arms 538, 540. The arm 538 is formed integrally, or fixed to the internal shaft 42 arranged to drive the inner member of one of the overrunning clutches housed in the receptacle 148 of the output shaft 150, while the other arm 540 drives the hollow shaft 44 and through it, the other of the two overrunning clutches. The remainder of the parts at the output end are substantially identical with those of FIG. 5 and are marked accordingly.

The operation of the fixed ratio transmission is essentially the same as that of the variable ratio transmissions hereinabove described with their cams locked in one position. On account of the omission of the variable control parts, however, it is considerably more compact. The ratio of the fixed ratio transmission may be changed by the mere substitution of different cam discs 522. Thus FIG. 16 shows in side elevation a cam disc 522' with a cam track 524' having one-half the maximum rise of the cam disc 522 shown in FIG. 14 and therefore providing a fixed reduction ratio that is twice as great. FIG. 17 shows a similar view of a cam disc 522" having a cam track 524" of still lesser rise, namely onequarter of that of FIG. 14. Thus, for example, with the three cams shown there are available for the transmission exemplified in FIG. 14 the three ratios: ten-to-one, twenty-to-one, and forty-to-one.

For the manufacturer this ready convertibility provides the great advantage that he needs to make and store only one transmission and a selection of cam discs in order to have available a very wide range of reduction ratios. For the user who does not require ratio changes during operation but may wish to change fixed ratios, a very wide range is available with one transmission by the simple substitution of one part.

It is noteworthy that the transmission may be smaller and ligter as the reduction ratio is increased, particularly with constant output torque capacity. This is contrary to the trend of conventional geared transmissions and indicates an outstanding advantage for the present invention when applied to large reduction ratios such for example as those involved in the driving of marine and aeronautic propellers by turbine engines. With suitable choice of dimensions transmissions designed according to the invention, whether of fixed or variable ratio, are capable of very high speeds and powers as well as light duty such as met with in meter and clock drives.

In the forms of my invention hereinabove set forth I have only illustrated and described in the kinematic trains connecting the input shaft to the plural overrunning clutches either gears or rocking slides between the cam driven rollers and the overunning clutches. It should be understood that my invention is not thus limited and that I may, at these points in said trains, utilize alternative forms of motion transmission. By way of example, I have shown such an alternative form in FIGS. 18–21. The transmission 700 therein illustrated in general resembles the variable speed transmissions which I have already described. Said transmission 700 includes the usual casing constituting members 702, 704, 706 bolted together to form a unitary housing and closed at opposite ends by caps 707, 708. One end of an input shaft 710 is journalled in a ball bearing 712 that is carried by the casing member and held in by the cap 707 and the other end of said shaft is journalled in a needle bearing 714 mounted on a hub 716 at the inner end of a flange 718 extending inwardly from the casing member 704. The shaft 710 is axially splined for slidable reception of a cam 720 having a bore that matches the splines. Said cam is of the frusto-conical configuration that has been described in detail heretofore. Adjacent the large end of the cam I provide the usual annular track 722 in which a roller 724 rides. The roller is rotatable on the distal end of a rocking lever 726 that is fast on a shaft 728 journalled in the casing member 702 and extending to the outside of the transmission housing where it fixedly receives a worm gear sector 730 in mesh with a worm 732. Said worm is manually rotatable by suitable means such as disc or knob 774 thereby to vary the angular position of the lever 726 and thus selectively determines the axial location of the cam 720.

Figures 18, 19, 20, 21:
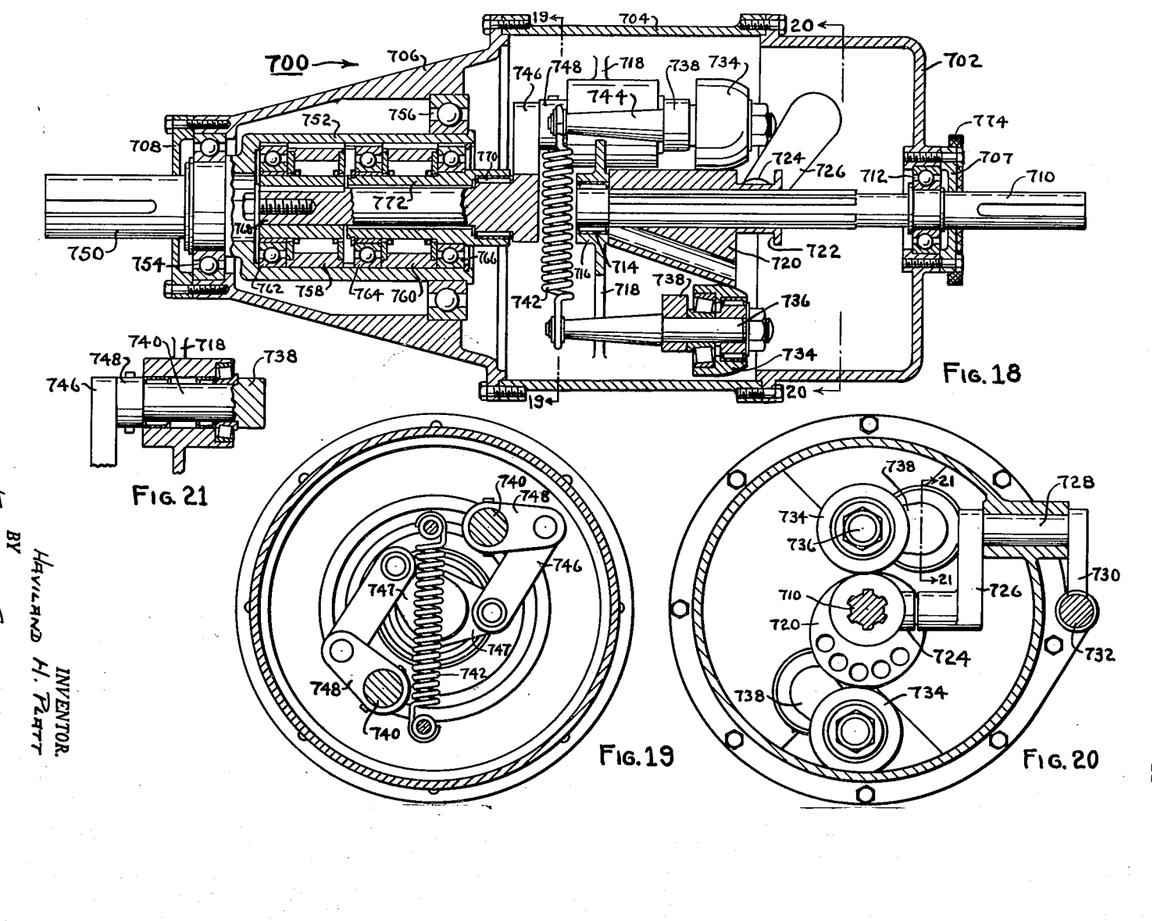
FIG. 18 is a view similar to FIG. 5 of another form of my invention, principally differing from the previously described forms in the kinematic connections between the cam followers and the unidirectional clutches.
FIG. 19 is a transverse sectional view taken substantially along the line 19—19 of FIG. 18 and showing said kinematic connection in some detail.
FIG. 20 is a transverse sectional view taken substantially along the line 20—20 of FIG. 18 and illustrating the remainder of the aforesaid kinematic connection.
FIG. 21 is a sectional view taken substantially along the line 21—21 of FIG. 20 and illustrating a journal for one of the said kinematic connections.

A pair of diametrically opposite rollers 734 engage the cam 720 so that by axially shifting the cam the throw of said rollers can be changed at will. The rollers 734 are mounted on studs 736, using a combination of needle and thrust bearings to permit free rolling motion of the rollers as well as to absorb thrust that is caused by the inclination of the surface of the cam. The studs 736 are secured to the outer ends of eccentric arms 738 that are operationally integral with cross shafts 740 on opposite sides of the input shaft so that as cam 720 revolves the cross-shafts will be oscillated in opposite phase in a successively continuous manner. A spring 742, held under tension between posts 744 extending from the studs 736, biases the rollers 734 into engagement with the cam 720.

As thus far described, the construction of the transmission 700 is not basically different from that of the transmission heretofore described with repect to FIGS. 5–7. However, the driving connection between the cross-shafts 740 and the overrunning clutches utilizes a different kind of kinematic system, to wit, a linkage, rather than a gear train or a rocking slide. More particularly, the cross-shafts 740 have pinned thereto radial driving arms 748 to the distal end of which there is pivotally connected one end of a driving link 746. The other end of each said driving link is pivotally connected to one or the other of two radial driving arms 747, as shown particularly in FIG. 19, a different one of said arms being associated with each of the two overrunning clutches.

An output shaft 750, in line with the input shaft 710 and constituting an extension of a tubular receptacle 752 is journalled, in part through said receptacle, in a pair of spaced ball bearings 754, 756. Within the receptacle I provide in the usual manner two overrunning cam clutches 758, 760. The leftmost clutch 758 (as viewed in FIG. 18) is sandwiched between a pair of ball bearings 762, 764 and the remaining, i.e. rightmost clutch 760 is sandwiched between the ball bearing 764 and a ball bearing 766. The outer members of both overrunning clutches 758, 760 are keyed to the receptacle 752 so that they are operationally integral with output shaft 750.

The overrunning clutch 758 has its inner member keyed to an internal shaft 768. Said shaft at one end and said clutch 758 are journalled in the bearing 762 and the other end of the shaft 768 is journalled in a needle bearing 770 carried by and within a hollow shaft 772. The hollow shaft 772 constitutes the inner member of the overrunning clutch 760 which inner member is journalled in the bearings 764, 766. The shaft 768 is driven by one of the arms 747 and the shaft 772 by the other of the arms 747.

It will be obvious that the operation of the transmission 700 is the same as that of all the other variable ratio transmissions detailed hereinabove, the links 746 and arms 747 replacing functionally the slot and roller or gear train mechanisms of said previously described arrangements.

The construction of the transmission 700 introduces into the system a greater non-linearity of angular motion than does the construction of the previously described transmissions, because of the use of linkage kinematic trains between the cam driven rollers and the overrunning clutches and also because of the specific location of the centers of the links. However, as mentioned earlier, there is no difficulty in compensating for such non-linearity by modifying the shape of the cam 720. It also should be noted that the transmission 700 obtains an execllent dynamic balance without the use of counterweights, thus minimizing the size and weight of the transmission.

While it has been indicated in connection with the in-line embodiments of the invention that the direction of rotation of the output shaft is the same as that of the input shaft; however, reversal of the input shaft rotation results in continued rotation without reversal of the output shaft, thus producing an opposite-rotation drive. For smooth output, in that case, the cam contour must be reversed and suitably modified also.

All forms of the transmission embodying the principles of the invention possess inherently a feature which is advantageous for many applications. This is that the output shaft is free-wheeling. In many instances this feature has hitherto been added by the inclusion in the system of a special device for the purpose. With transmissions of the present invention such an addition is unnecessary.

While several forms of the embodiment of the invention have been illustrated and described it will readily be understood that the principles and essential spirit of the invention may take a wide range of other forms in practice and that therefore the specific disclosure are illustrative rather than restrictive and the scope of the invention is defined only by the appended claims.

Having thus described the invention, there is claimed as new and desired to be secured by Letters Patent:

1. A speed transmission comprising a shaft, a cam mounted to turn with and to slide axially along said shaft, said cam being axially elongated and having axially progressively changing radical contour displacements of Archimedian spiral form, a plurality of overrunning coaxial clutches, an output member connected in common to all of said clutches, a plurality of spaced cam followers operatively engaging said cam and arranged to similarly track said cam, and means kinematicially connecting said cam followers and said clutches.

2. A speed transmission comprising an input shaft, a cam slidable on said shaft and having a progressively changing radial contour of Archimedian spiral form along its length, means to vary the axial position of the cam on said shaft, plural spaced cam followers mounted to engage said cam and to track in one another's paths thereon, plural coaxial overrunning clutches each including a pawl-type member and a ratchet-type member, means kinematically interconnecting each cam follower with the pawl-type member of a different clutch, and means connecting the ratchet-type members for joint rotation.

3. A speed transmission as set forth in claim 2 wherein each kinematic interconnecting means includes linkages and gears.

4. A speed transmission as set forth in claim 2 wherein the ratchet-type members are ratchets and wherein the pawl-type members are pawls.

5. A speed transmission as set forth in claim 2 wherein the ratchet-type members and pawl-type members jointly constitute cam clutches.

6. A speed transmission as set forth in claim 2 wherein there are at least three overrunning clutches.

7. A speed transmission as set forth in claim 2 wherein means is included to oscillatably support the cam followers for rocking movement about axes perpendicular to the input shaft.

8. A speed transmission as set forth in claim 2 wherein each kinematic interconnecting means includes a linkage, a block and slot, and a universal connection between the linkage and the block.

9. A speed transmission comprising an input shaft, a cam fixed on said shaft, said cam being of Archimedian spiral form, plural spaced cam followers mounted to engage said cam and to track in one another's paths thereon, plural coaxial overrunning clutches each including a pawl-type member and a ratchet-type member, means kinematically interconnecting each cam follower with the pawl-type member of a different clutch, and means connecting the ratchet-type members for joint rotation.

10. A speed transmission as set forth in claim 9 wherein the cam includes a slot in which the cam followers ride.

11. A speed transmission as set forth in claim 9 wherein the fixed cam is detachably mounted on the shaft whereby to permit substitution therefor of a similar cam having a different shape so as to change the speed reduction of the transmission.

12. A speed transmission comprising an input shaft, a cam on said shaft, said cam being of Archimedian spiral form, plural spaced cam followers mounted to engage said cam and to track in one another's paths thereon, plural coaxial overrunning clutches each including a pawl-type member and a ratchet-type member, the axes of said clutch members being at an angle to the axis of the input shaft, means kinematically interconnecting each cam follower with the pawl-type member of a different clutch, and means connecting the ratchet-type members for joint rotation.

13. A speed reducing transmission comprising two shafts, a cam on one of said shafts, a plurality of cam followers mounted to engage said cam, a plurality of overrunning clutches connected to engage the other of said shafts, and linkages interconnecting said cam followers and said clutches, said cam having an Archimedian spiral contour producing a uniform ratio of angular velocities between said shafts.

References Cited in the file of this patent

UNITED STATES PATENTS

| | | |
|---|---|---|
| 289,216 | Bush | Nov. 27, 1883 |
| 724,392 | Hurd | Mar. 31, 1903 |
| 1,427,223 | Miller | Aug. 29, 1922 |

FOREIGN PATENTS

| | | |
|---|---|---|
| 358,570 | Great Britain | Oct. 12, 1931 |
| 79,559 | Sweden | Mar. 17, 1932 |
| 131,558 | Australia | Jan. 16, 1947 |
| 527,691 | Belgium | Apr. 15, 1954 |